(12) United States Patent
Patella

(10) Patent No.: US 7,480,947 B2
(45) Date of Patent: Jan. 27, 2009

(54) SOFA ARM COMPRISING MEANS FOR FIXING IT TO THE SOFA FRAME

(75) Inventor: Giuseppe Patella, Altamura (IT)

(73) Assignee: Racheli & C SpA, Milan (IT)

( * ) Notice: Subject to any disclaimer, the term of this patent is extended or adjusted under 35 U.S.C. 154(b) by 226 days.

(21) Appl. No.: 10/588,223

(22) PCT Filed: Jan. 14, 2005

(86) PCT No.: PCT/EP2005/000306

§ 371 (c)(1),
(2), (4) Date: Aug. 3, 2006

(87) PCT Pub. No.: WO2005/075840

PCT Pub. Date: Aug. 18, 2005

(65) Prior Publication Data

US 2007/0136945 A1 Jun. 21, 2007

(30) Foreign Application Priority Data

Feb. 4, 2004 (IT) .......................... MI20040037 U

(51) Int. Cl.
*A47C 17/00* (2006.01)
*F16B 12/60* (2006.01)
(52) U.S. Cl. ........................................ 5/52; 297/440.23
(58) Field of Classification Search ........................ 5/52, 5/51.1, 12.1; 297/440.23, 440.16
See application file for complete search history.

(56) References Cited

U.S. PATENT DOCUMENTS

| 2,650,656 | A | 9/1953 | Ohlsson |
| 2,914,118 | A | 11/1959 | Sawyers |
| 4,022,502 | A | 5/1977 | Smith et al. |
| 5,890,767 | A | 4/1999 | Chang et al. |
| 6,241,317 | B1 * | 6/2001 | Wu ........................ 297/440.23 |
| 2003/0011231 | A1 | 1/2003 | Guillot |

FOREIGN PATENT DOCUMENTS

| GB | 138276 | 2/1920 |
| WO | 92/00029 | 1/1992 |

OTHER PUBLICATIONS

International Search Report of PCT/EP2005/000306, mailed Jun. 6, 2005.

* cited by examiner

*Primary Examiner*—Alexander Grosz
(74) *Attorney, Agent, or Firm*—Nixon & Vanderhye PC

(57) ABSTRACT

A sofa arm (1) is described, connected to the frame (2) of the sofa by means of at least one bayonet coupling (3), which comprises means designed to fix it reversibly to the frame of the sofa. The fixing means comprise, for each bayonet coupling, an L-shaped body (4) integral with the element of the bayonet coupling which is fixed to the arm (1) or with that fixed to the frame of the sofa, locking means (5) integral with the frame of the sofa or with the arm and a screw (6), inserted into a through hole present in the area of the L-shaped body (4) that protrudes with respect to the surface of the arm or with respect to the surface of the frame and into the locking means (5) to reversibly fix the L-shaped body (and the arm) to the frame of the sofa (1). The arm advantageously also carries the supporting feet (7) of the sofa.

12 Claims, 6 Drawing Sheets

SOFA ARM COMPRISING MEANS FOR FIXING IT TO THE SOFA FRAME

This application is the US national phase of international application PCT/EP2005/000306, filed 14 Jan. 2005, which designated the U.S. and claims priority of IT MI2004U000037, filed 4 Feb. 2004, the entire contents of each of which are hereby incorporated by reference.

The present invention refers to a sofa arm, connected to the frame of a sofa by means of at least one bayonet coupling, which comprises means designed to connect or fix it removably or reversibly to the frame of the sofa.

The bayonet couplings will not be described herein because they are known to the art and widely used to join the arms to the frame of a sofa: said bayonet couplings are preferably used for sofa beds because they allow the arms to be removed easily, if necessary, during the transformation from "sofa" to "bed" and to be put back in place during the reverse transformation, but they can advantageously be used for other types of sofas too since they allow the arms to be attached easily to the frame only when the sofa is in the purchaser's home, reducing the overall dimensions of the sofa and thus simplifying its storage and transport.

In the present description, the word "sofa" will refer either to a sofa bed or to any other type of sofa whose arms are (or can be) fixed by means of bayonet couplings.

FIG. 1 shows diagrammatically a perspective view of a known arm 1 during its assembly on the frame 2 of a sofa, to which it is connected by means of two already known bayonet couplings 3; supporting feet 7 which support the sofa are integral with the frame 2.

Bayonet couplings, however, have some drawbacks and limitations, amongst which that of not being able to prevent the arms from separating from the frame when the sofa is to be lifted, for example to move it: this makes it necessary to lift the sofa by grasping it under the frame rather than under the arms, as would be more convenient.

Object of the present invention is a sofa arm that is free from the above drawbacks and has the characterising features illustrated in claim 1; further advantageous characteristics of the invention form the object of the dependent claims.

Exemplary embodiments of the invention will be described hereunder, purely by way of non-limiting illustration, with reference to the appended drawings, in which.

Figure 1:
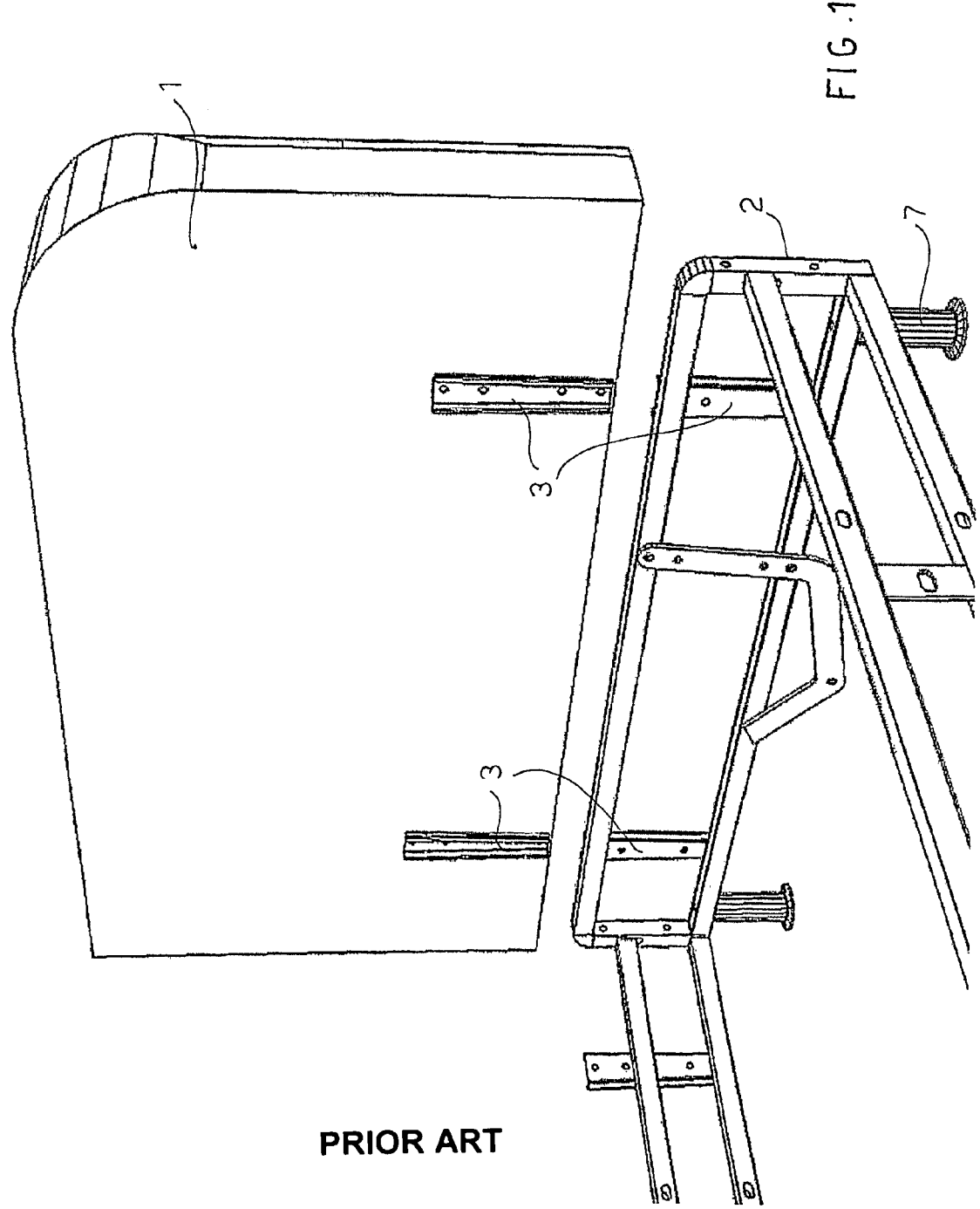
FIG. 1 shows diagrammatically a perspective view of a known arm during its assembly on the frame of the sofa.

In the appended drawings like elements will be identified by the same reference numerals; moreover, all the elements of the sofa (seat, back, mechanisms—if any—for passing from the "sofa" configuration to the "bed" configuration and vice versa, etc.) have been omitted for the sake of simplicity of the graphic representation.

FIG. 1 shows diagrammatically a perspective view of a known arm 1 during its assembly on the frame 2 of the sofa to which it is connected by means of two already known bayonet couplings 3; supporting feet 7 which support the sofa are integral with the frame 2.

An arm 1 made according to the invention differs from those of the prior art essentially in that it comprises means designed to fix it reversibly to the frame of the sofa; said arm 1 advantageously also comprises the feet supporting the sofa.

Figure 2:
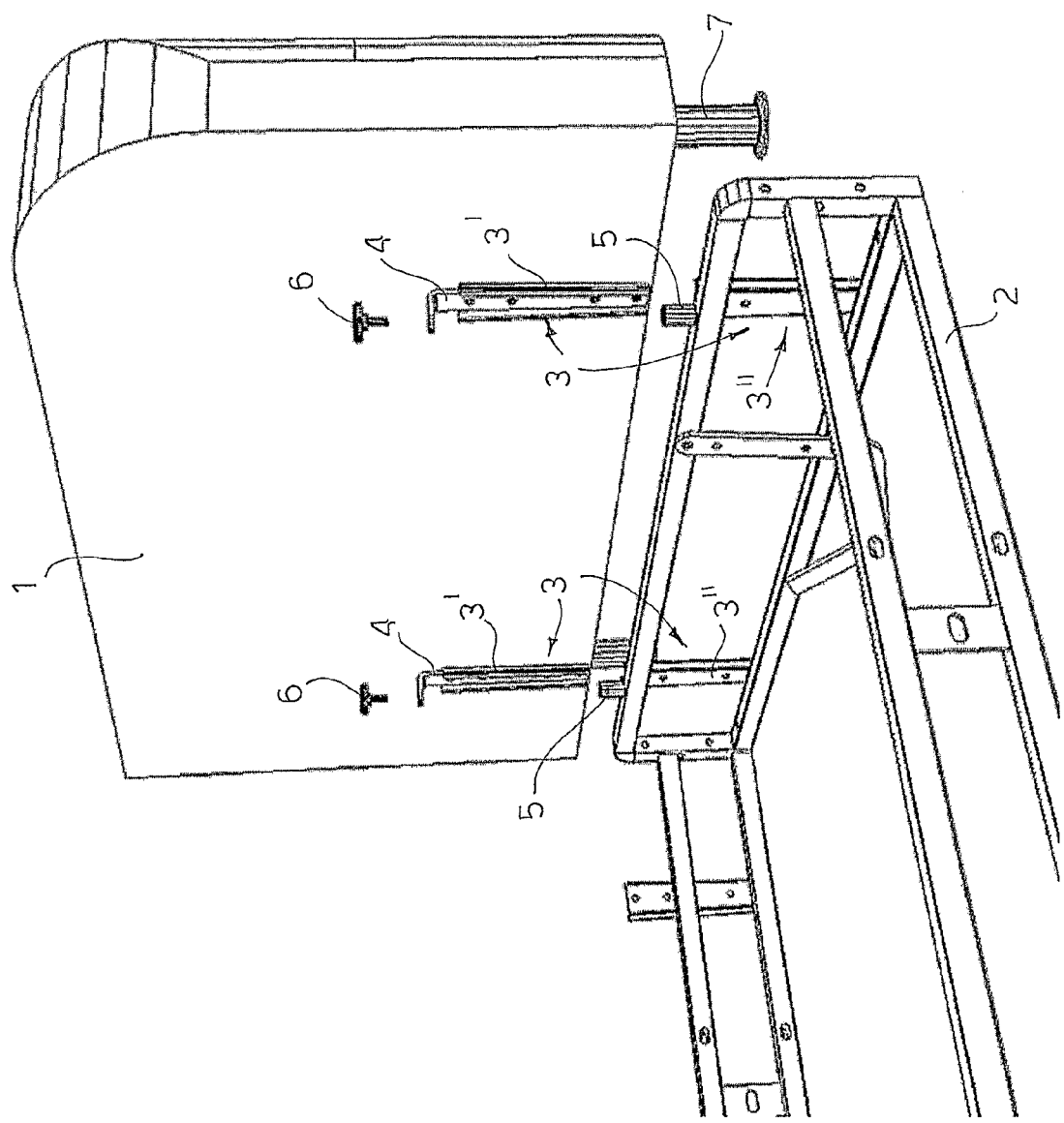
FIGS. 2 to 4 are perspective views that show diagrammatically three steps of the assembly on the frame of the sofa of a first embodiment of an arm according to the invention.
Figure 3:
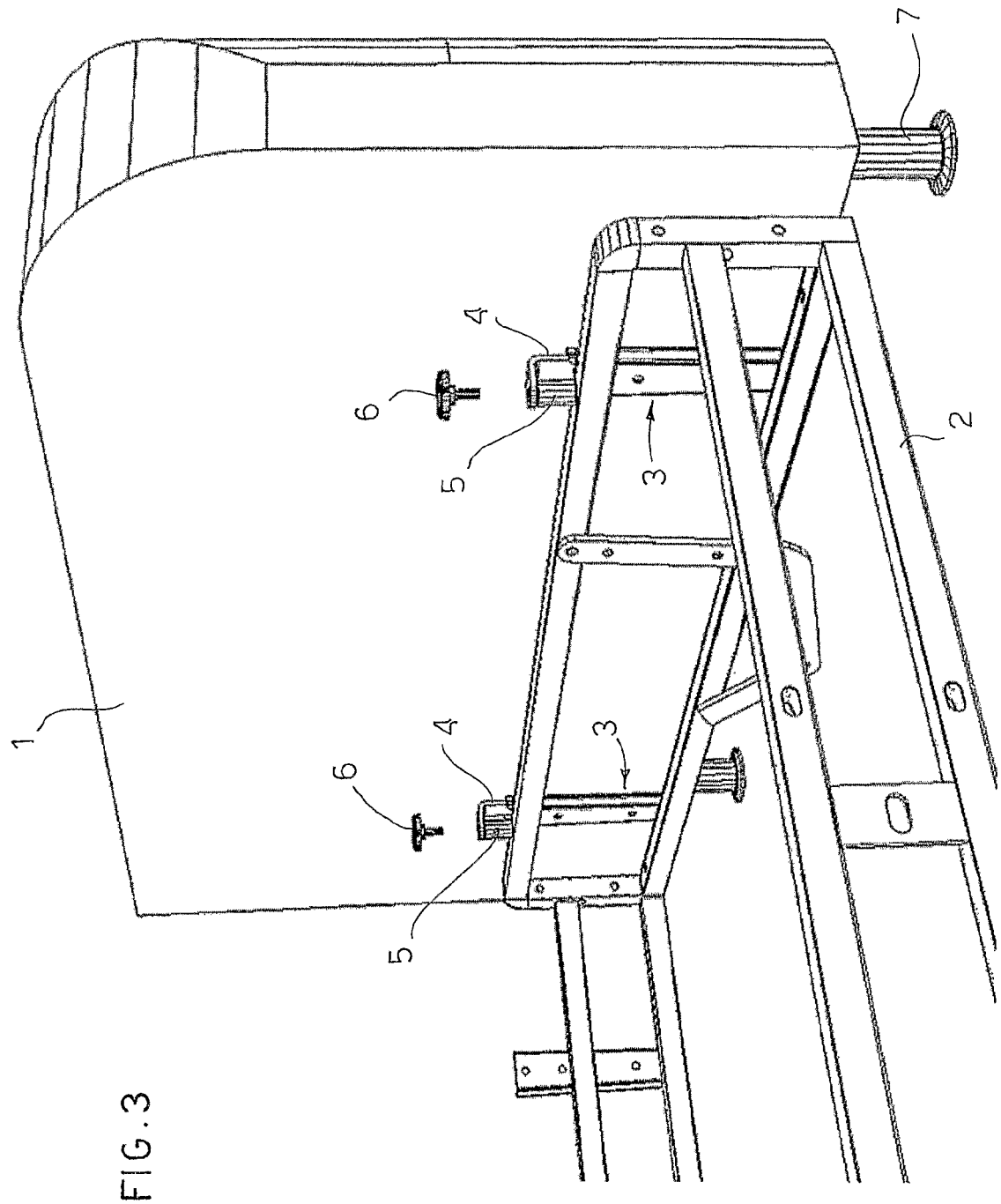
Figure 4:
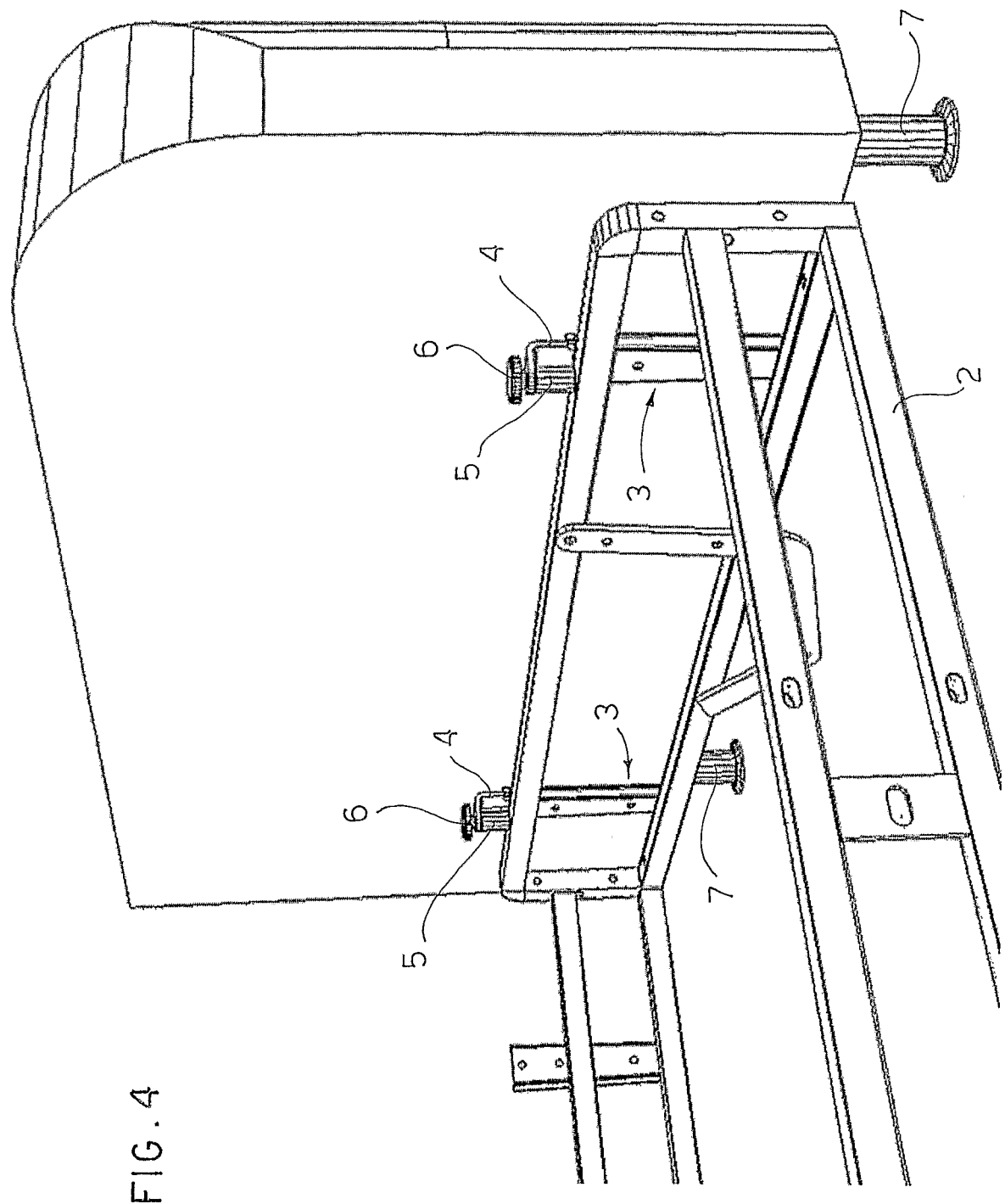

FIGS. 2 to 4 are perspective views that show diagrammatically three steps of the assembly on the sofa frame 2 of a first embodiment of an arm 1 according to the invention.

FIG. 2 shows the arm 1 before it is fixed on the frame 2 by means of the bayonet couplings 3: FIG. 2 shows the elements (3', 3"), fixed to the arm 1 and to the frame 2, respectively, which make up each bayonet coupling 3 and the means for fixing the arm 1 to the frame 2 which comprise, for each bayonet coupling 3:

an L-shaped body 4, integral with the element 3' of the bayonet coupling 3 which is integral with the arm 1, wherein the area of the body 4 which protrudes with respect to the plane of the arm 1 has a through hole (not visible in FIGS. 2-5);

locking means 5, integral with the frame 2 of the sofa;

a screw 6, designed to be inserted in the through hole of the body 4 and in the locking means 5 to fix the body 4, integral with the arm 1, to the frame 2.

The screw 6 can advantageously be removed to fix the arm 1 reversibly to the frame 2 of the sofa: for this purpose the screw 6 has a widened head (or other per se known functionally equivalent means), which makes it easy to remove.

Without departing from the scope of the invention, the screw 6 can be such that it cannot be removed and it fixes therefore the arm 1 to the frame 2 of the sofa irreversibly.

The above described fixing means, by making the arms 1 integral with the frame 2 of the sofa, allow the sofa to be lifted and, if necessary, moved by grasping it by the arms, that is, in a more convenient manner than that allowed by known sofas, which lack said fixing means.

FIG. 3 shows the arm 1 fixed to the frame 2 by means of the bayonet couplings 3; the body 4, integral with each bayonet coupling 3, is in contact with the corresponding locking means 5 integral with the frame 2 of the sofa, whilst the screw 6 has not yet been inserted in the hole in the body 4 and in the locking means 5.

FIG. 4 shows the arm 1 fixed to the frame 2 of the sofa and differs from FIG. 3 in that the screw 6 has been inserted in the hole in the body 4 and in the locking means 5, fixing the body 4 and, consequently, the arm 1 with which the body 4 is integral, to the frame 2 of the sofa.

Figure 5:
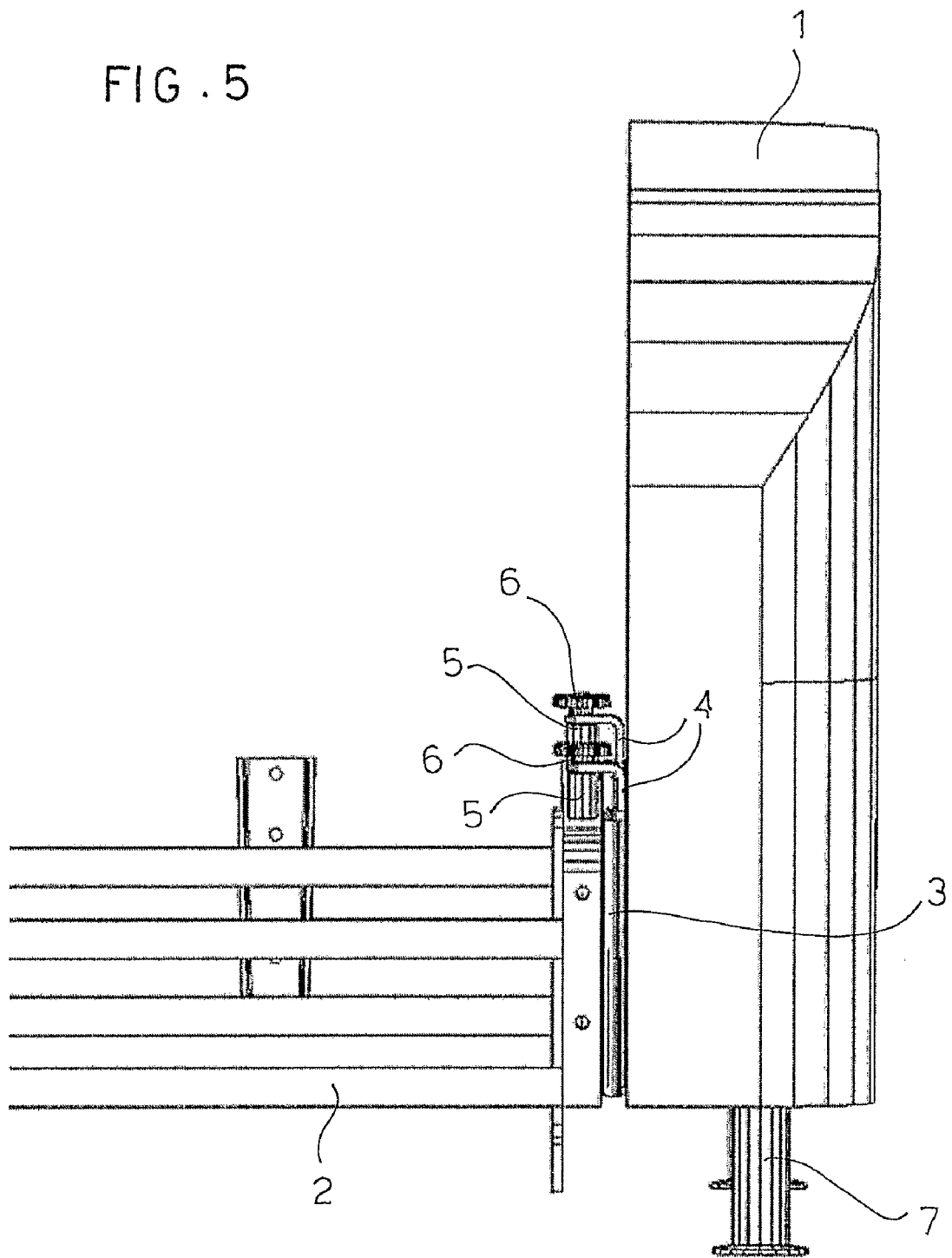
FIG. 5 shows diagrammatically a side view of the arm shown in FIGS. 2-4, fixed to the frame of the sofa.

FIG. 5 shows diagrammatically a side view of the arm 1 shown in FIGS. 2-4, connected to the frame 2 of the sofa by means of the bayonet couplings 3 and fixed thereto by the screws 6, inserted into the holes in the bodies 4 and into the fixing means 5.

Figure 6:
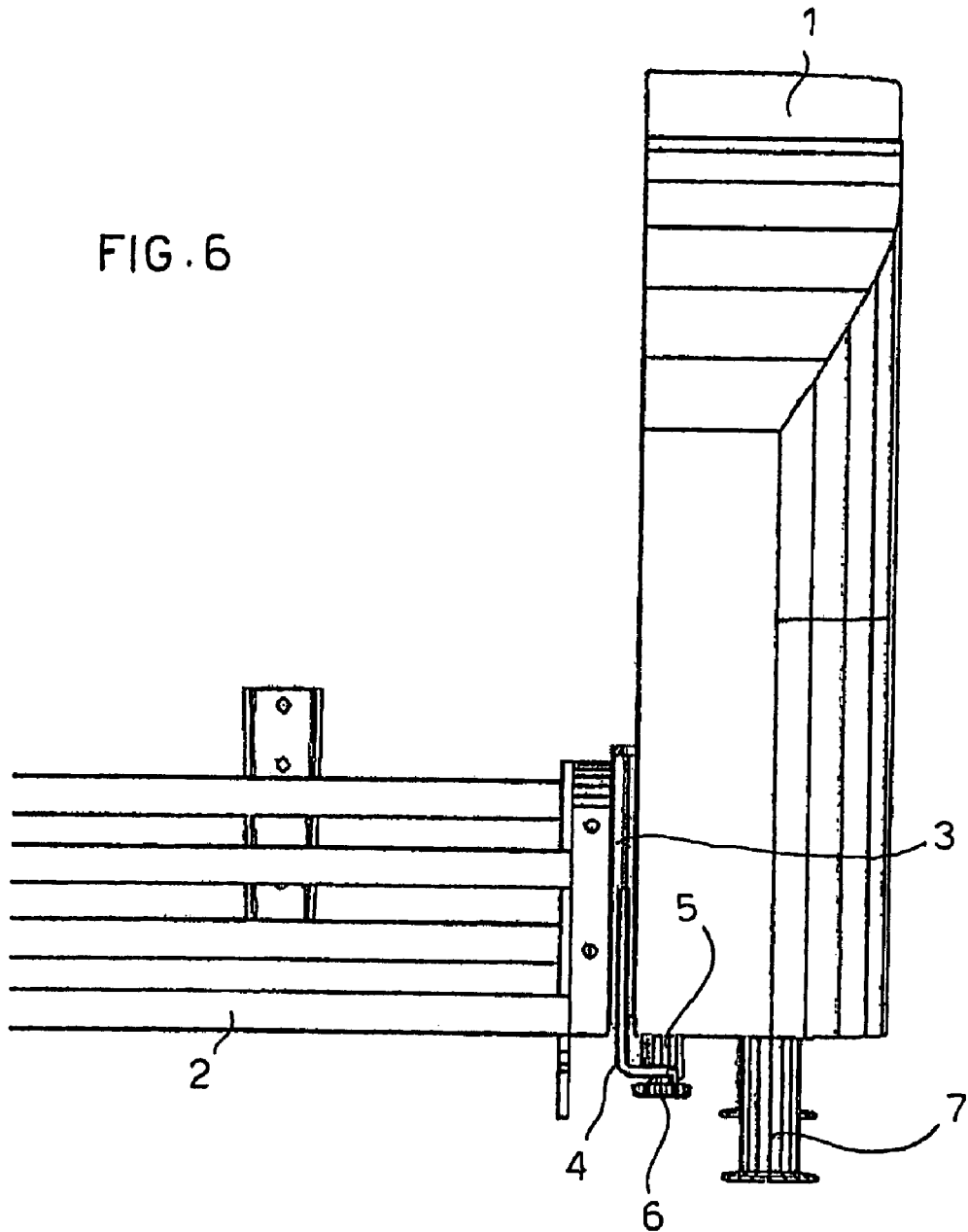
FIG. 6 shows diagrammatically a side view of a second embodiment of an arm according to the invention, fixed to the frame of the sofa.

FIG. 6 shows diagrammatically a side view of a second embodiment of an arm 1 according to the invention, which differs from the first embodiment (FIGS. 2-5) in that the L-shaped body 4 is integral with the element 3" of the bayonet coupling 3 and the locking means 5 are integral with the arm 1.

In FIGS. 2-6 the body 4 consists of an L-shaped bracket fixed to the element 3' (FIGS. 2-5) or to the element 3" (FIG. 6) of the bayonet coupling 3 and the locking means 5 consist of a threaded bush integral with the frame 2 of the sofa (FIGS. 2-5) or with the arm 1 (FIG. 6) but, without departing from the scope of the invention:

the body 4 can consist of an end of the element 3' (FIGS. 2-5) or of the element 3" (FIG. 6) of the bayonet coupling 3, bent into an L shape;

the locking means 5 can consist of a threaded hole formed in the frame 2 (FIGS. 2-5) or of a through hole formed in the frame 2: in the last case the screw 6 is blocked by means of a nut.

Lastly, the above fixing means (4, 5, 6) make the arms 1 integral with the frame 2 of the sofa and thus allow the supporting feet 7, which support the sofa, to be moved from the frame 2 (as in the known sofa shown in FIG. 1) to the arms 1, as shown in the embodiments described by way of non-limiting example in FIGS. 2-6.

This movement allows the height and the shape of the feet 7 to be adapted to those of the arms 1 by which they are carried, to combine a single frame 2 with different arms 1 for making a plurality of sofas (different in the appearance and/or in the height from the ground of the frame 2) suitable to meet specific requirements and/or preferences of the users and to "update" (or to modify) the design of an existing sofa by merely replacing the arms 1.

Without departing from the scope of the invention, a person skilled in the art can make to the above described device those changes and improvements suggested by normal experience and/or the evolution of the art.

The invention claimed is:

1. An arm (1) for a sofa with a metallic frame (2) having at least one bayonet coupling (3) by which the arm (1) is connected to the metallic frame (2) of the sofa, characterized in that said arm (1) comprises means constructed to connect it removably to the frame (2) of the sofa, said connecting means comprising:
   - an L-shaped body (4) connected to one of the elements (3', 3") of the bayonet coupling (3), the portion of said body (4) that protrudes with respect to the surface of the arm (1) or with respect to the surface of the frame (2) having a through hole;
   - locking means (5) connected to the frame (2) of the sofa or the arm (1); and
   - a screw (6) constructed to be inserted into the through hole of the L-shaped body (4) and into the locking means (5) to connect the body (4) to the frame (2) of the sofa.

2. An arm (1) according to claim 1, characterized in that the body (4) comprises an end, bent into an L shape, of the element (3') of the bayonet coupling (3) which is connected to the arm (1).

3. An arm (1) according to claim 2, characterized in that the locking means (5) comprises a threaded hole formed in the frame (2) of the sofa.

4. An arm (1) according to claim 2, characterized in that the locking means (5) comprises a through hole made in the frame (2) of the sofa and in that the screw (6) is locked by means of a nut.

5. An arm (1) according to claim 1, characterized in that the body (4) comprises an L-shaped bracket fixed to the element (3") of the bayonet coupling (3) which is connected to the frame (2).

6. An arm (1) according to claim 1, characterized in that the body (4) comprises an end, bent into an L shape, of the element (3") of the bayonet coupling (3) which is connected to the frame (2).

7. An arm (1) according to claim 1, characterized in that the locking means (5) comprise a threaded bush connected to the frame (2) of the sofa or to the arm (1).

8. An arm (1) according to claim 1, characterized in that it further carries the supporting feet (7) of the sofa.

9. An arm (1) according to 1, characterized in that the screw (6) is constructed to be removed so that the arm (1) may be removed from the frame (2) of the sofa.

10. An arm (1) according to claim 1, characterized in that the body (4) comprises of an L-shaped bracket fixed to the element (3') of the bayonet coupling (3) which is connected to the arm (1).

11. An arm (1) according to claim 10, characterized in that the locking means (5) comprises a threaded hole formed in the frame (2) of the sofa.

12. An arm (1) according to claim 10, characterized in that the locking means (5) comprises a through hole made in the frame (2) of the sofa and in that the screw (6) is locked by means of a nut.

\* \* \* \* \*